(12) United States Patent
Yoon et al.

(10) Patent No.: US 8,718,326 B2
(45) Date of Patent: May 6, 2014

(54) SYSTEM AND METHOD FOR EXTRACTING THREE-DIMENSIONAL COORDINATES

(75) Inventors: Suk June Yoon, Seoul (KR); Kyung Shik Roh, Seongnam-si (KR); Seung Yong Hyung, Yongin-si (KR); Sung Hwan Ahn, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 90 days.

(21) Appl. No.: 13/298,834

(22) Filed: Nov. 17, 2011

(65) Prior Publication Data

US 2012/0134537 A1    May 31, 2012

(30) Foreign Application Priority Data

Nov. 30, 2010    (KR) .......................... 10-2010-0120312

(51) Int. Cl.
*G06K 9/00*    (2006.01)

(52) U.S. Cl.
USPC ......................................................... 382/103

(58) Field of Classification Search
None
See application file for complete search history.

(56) References Cited

U.S. PATENT DOCUMENTS

2012/0051600 A1*    3/2012    Nishigaki ..................... 382/106

OTHER PUBLICATIONS

Hahne, Uwe, and Marc Alexa. "Depth imaging by combining time-of-flight and on-demand stereo." In Dynamic 3D Imaging, pp. 70-83. Springer Berlin Heidelberg, 2009.*
Gudmundsson, Sigurjon Arni, Henrik Aanaes, and Rasmus Larsen. "Fusion of stereo vision and time-of-flight imaging for improved 3d estimation." International Journal of Intelligent Systems Technologies and Applications 5.3 (2008): 425-433.*
Jojic, Nebojsa, Matthew Turk, and Thomas S. Huang. "Tracking self-occluding articulated objects in dense disparity maps." Computer Vision, 1999. The Proceedings of the Seventh IEEE International Conference on. vol. 1. IEEE, 1999.*

* cited by examiner

*Primary Examiner* — Nirav G Patel
(74) *Attorney, Agent, or Firm* — Staas & Halsey LLP (57) ABSTRACT

A system and method for extracting 3D coordinates, the method includes obtaining, by a stereoscopic image photographing unit, two images of a target object, and obtaining 3D coordinates of the object on the basis of coordinates of each pixel of the two images, measuring, by a Time of Flight (TOF) sensor unit, a value of a distance to the object, and obtaining 3D coordinates of the object on the basis of the measured distance value, mapping pixel coordinates of each image to the 3D coordinates obtained through the TOF sensor unit, and calibrating the mapped result, determining whether each set of pixel coordinates and the distance value to the object measured through the TOF sensor unit are present, calculating a disparity value on the basis of the distance value or the pixel coordinates, and calculating 3D coordinates of the object on the basis of the calculated disparity value.

12 Claims, 5 Drawing Sheets

SYSTEM AND METHOD FOR EXTRACTING THREE-DIMENSIONAL COORDINATES

CROSS-REFERENCE TO RELATED APPLICATIONS

This application claims the priority benefit of Korean Patent Application No. 10-2010-0120312, filed on Nov. 30, 2010 in the Korean Intellectual Property Office, the disclosure of which is incorporated herein by reference.

BACKGROUND

1. Field

Embodiments relate to a system and method for extracting three-dimensional (3D) coordinates using image information obtained from a stereoscopic-image photographing unit and a Time of Flight (TOF) sensor unit.

2. Description of the Related Art

Methods for obtaining three-dimensional (3D) information from an object or scene may be largely classified into two methods. The first method may be any of active methods, for example, a method for employing a 3D scanner, a method for employing a structured light pattern, and a method for employing a ranging camera. In this case, 3D information may be relatively and correctly obtained. However, in order to obtain such relative correct 3D information, the cost of device required for such correct 3D information is very high and it is impossible for most cameras other than the ranging camera to perform modeling of a dynamic object or scene.

The second method may be any of passive methods, for example, a stereo matching method using a binocular stereoscopic image, a silhouette-based method, a VOXEL (volume cell) coloring method acting as a volume-based modeling method, a Shape From Motion (SFM) method for calculating 3D information of a static object having multiple viewpoints captured by the moving camera, and a Shape From Shading (SFS) method for employing shade information. The second method may generate 3D information using an image obtained from a multi-viewpoint optical camera, and is advantageous over the first method in that the second method obtains 3D information at lower cost and has higher resolution than the first method. In contrast, the second method has a disadvantage in that the reliability of depth information is lower than that of the first method because of various image characteristics, for example, variation of illumination, texture, and the presence of a shield region.

SUMMARY

Therefore, it is an aspect one or more embodiments to provide a system and method for extracting 3D coordinates so as to extract highly reliable 3D coordinates using image information obtained from a stereoscopic image photographing unit and a Time of Flight (TOF) sensor unit.

Additional aspects of one or more embodiments will be set forth in part in the description which follows and, in part, will be apparent from the description, or may be learned by practice of the invention.

In accordance with one aspect of the present invention, a system for extracting 3D coordinates includes a stereoscopic image photographing unit to obtain two images by capturing an image of an object using each of two photographing units, and obtain 3D coordinates of the object on the basis of coordinates of each pixel contained in each of the two images; a Time Of Flight (TOF) sensor unit to measure a value of a distance to the object, and obtain 3D coordinates of the object on the basis of the measured distance value; and a controller to determine whether each set of pixel coordinates obtained through the stereoscopic image photographing unit and the distance value to the object measured through the TOF sensor unit corresponding to each set of pixel coordinates are present, calculate a disparity value on the basis of the distance value or the pixel coordinates obtained through the stereoscopic image photographing unit, and calculate 3D coordinates of the object on the basis of the calculated disparity value.

The system may further include a calibration unit to map pixel coordinates of each image captured through the stereoscopic image photographing unit to 3D coordinates obtained through the TOF sensor unit, and calibrate the 3D coordinates.

If each set of pixel coordinates obtained through the stereoscopic image photographing unit and a value of a distance to the object measured through the TOF sensor unit corresponding to each set of pixel coordinates are present, the controller may calculate the disparity value on the basis of the measured distance value.

The controller may calculate correlation between each set of pixel coordinates obtained through the stereoscopic image photographing unit on the basis of the distance value, and calculates the disparity value on the basis of the calculated correlation.

The controller may calculate the disparity value on the basis of the distance value when the calculated correlation is equal to or less than a predetermined value.

If each set of pixel coordinates obtained through the stereoscopic image photographing unit and a distance to the object measured through the TOF sensor unit corresponding to each set of pixel coordinates are not present, the controller may calculate the disparity value through stereoscopic processing of the stereoscopic image photographing unit.

The system may further include a filter unit to determine whether the calculated disparity value is equal to or higher than a predetermined value, delete the calculated 3D coordinates of the object depending upon the calculated disparity value when the calculated disparity value is equal to or higher than the predetermined value, and feed back the calculated 3D coordinates of the object to the controller when the calculated disparity value is less than the predetermined value.

In accordance with another aspect of the present invention, a method for extracting 3D coordinates includes, obtaining, by a stereoscopic image photographing unit, two images by capturing an image of a target object using each of two photographing lenses, and obtaining 3D coordinates of the object on the basis of coordinates of each pixel contained in each of the two images; measuring, by a Time of Flight (TOF) sensor unit, a value of a distance to the object, and obtaining 3D coordinates of the object on the basis of the measured distance value; mapping pixel coordinates of each image captured by the stereoscopic image photographing unit to the 3D coordinates obtained through the TOF sensor unit, and calibrating the mapped result; determining whether each set of pixel coordinates obtained through the stereoscopic image photographing unit and the distance value to the object measured through the TOF sensor unit corresponding to each set of pixel coordinates are present; calculating a disparity value on the basis of the distance value or the pixel coordinates obtained through the stereoscopic image photographing unit; and calculating 3D coordinates of the object on the basis of the calculated disparity value.

The calculation of the disparity value on the basis of the distance value or each set of pixel coordinates obtained through the stereoscopic image photographing unit may include calculating the disparity value on the basis of the measured distance value, if each set of pixel coordinates obtained through the stereoscopic image photographing unit and a value of the distance to the object measured through the TOF sensor unit corresponding to each set of pixel coordinates are present.

The calculation of the disparity value on the basis of the distance value or each set of pixel coordinates obtained through the stereoscopic image photographing unit may include calculating correlation between each set of pixel coordinates obtained through the stereoscopic image photographing unit on the basis of the distance value, and calculating the disparity value on the basis of the calculated correlation.

The calculation of the disparity value on the basis of the calculated correlation may include calculating the disparity value on the basis of the distance value when the calculated correlation is equal to or less than a predetermined value.

The calculation of the disparity value on the basis of the distance value or each set of pixel coordinates obtained through the stereoscopic image photographing unit may include calculating the disparity value through stereoscopic processing of the stereoscopic image photographing unit, if each set of pixel coordinates obtained through the stereoscopic image photographing unit and a distance to the object measured through the TOF sensor unit corresponding to each set of pixel coordinates are not present.

The method may further include determining whether the calculated disparity value is equal to or higher than a predetermined value, removing the calculated 3D coordinates of the object depending upon the calculated disparity value when the calculated disparity value is equal to or higher than the predetermined value; and calculating 3D coordinates of the object in response to the calculated disparity value when the calculated disparity value is less than the predetermined value.

BRIEF DESCRIPTION OF THE DRAWINGS

These and/or other aspects of one or more embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
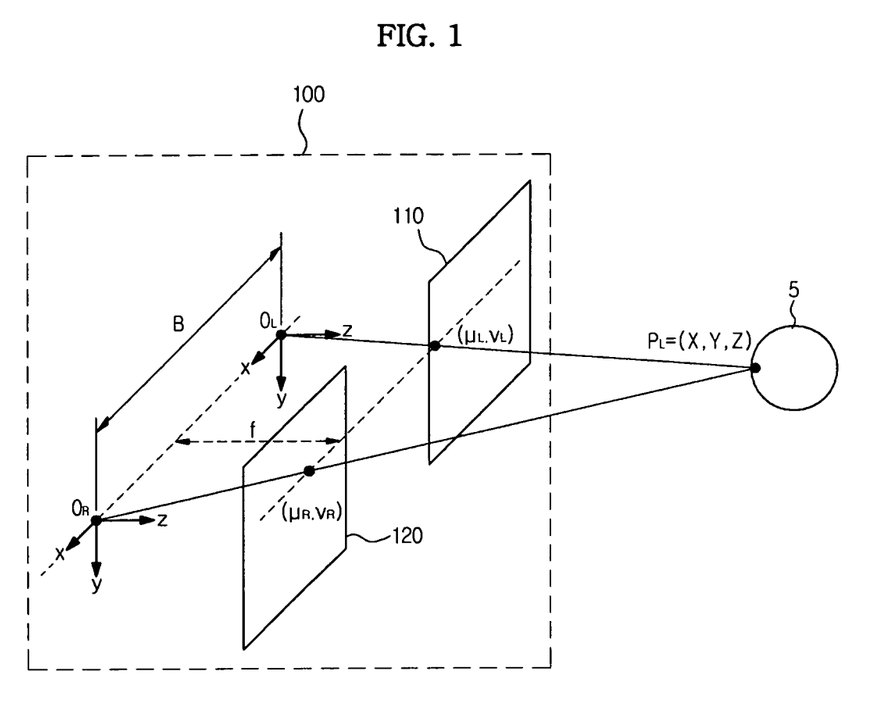
FIG. 1 is a conceptual diagram illustrating a stereoscopic image photographing unit of a system for extracting 3D coordinates according to an embodiment.

FIG. 1 is a conceptual diagram illustrating a stereoscopic image photographing unit of a system for extracting 3D coordinates according to an embodiment.

Referring to FIG. 1, a stereoscopic-image photographing unit 100 includes a left photographing lens 110 on the basis of an origin ($O_L$) and a right photographing lens 120 on the basis of another origin ($O_R$).

The distance between the two origins (i.e., the origin $O_L$ of the left photographing lens and the origin $O_R$ of the right photographing lens) of the stereoscopic image photographing unit 100 is a base line (B).

The length of a line segment perpendicular to two photographing lenses 110 and 120 on the basis of two origins ($O_L$ and $O_R$) of the stereoscopic image photographing unit 100 is denoted by a focal length (f).

The object 5 captured by the stereoscopic image photographing unit 100 may be denoted by image coordinates (u, v) on two photographing lenses 110 and 120. The image coordinates shown on the left photographing lens 110 are ($u_L$, $v_L$), and the image coordinates shown on the right photographing lens 120 are ($u_R$, $v_R$).

3D coordinates ($P_L$) of the object 5 captured by the stereoscopic image photographing unit 100 may be denoted by $P_L$=(X, Y, Z).

Respective image coordinates are based on the following equations.

Equations $$(u_L, v_L) = \left(f\frac{X}{Z}, f\frac{Y}{Z}\right)$$

$$(u_R, v_R) = \left(f\frac{X-B}{Z}, f\frac{Y}{Z}\right)$$

The stereoscopic image photographing unit 100 photographs each object 5 using each of two photographing lenses 110 and 120, and obtains 3D coordinates of the object 5 on the basis of respective pixel coordinates (($u_L$, $v_L$) and ($u_R$, $v_R$)) respectively contained in two images.

The stereoscopic image photographing unit 100 may simultaneously obtain two images of the same object 5. The stereoscopic image photographing unit 100 arranges two photographing lenses 110 and 120 separately from each other and photographs the same object 5 using the photographing lenses 110 and 120 spaced apart from each other.

The stereoscopic image photographing unit 100 calculates a disparity value of pixel coordinates ((($u_L$, $v_L$) and ($u_R$, $v_R$)) respectively contained in the two photographed images, and calculates 3D coordinates ($P_L$) of the object 5 through the calculated disparity value. The disparity value is a difference between two coordinates (($u_L$, $v_L$) and ($u_R$, $v_R$)) obtained from images captured by the left photographing lens 110 and the right photographing lens 120 with respect to the same point in space.

A disparity (d) between respective pixel coordinates (($u_L$, $v_L$) and ($u_R$, $v_R$)) may be represented by the following equation.

Equation $$d = u_L - u_R = f\frac{B}{Z}$$

Figure 2:
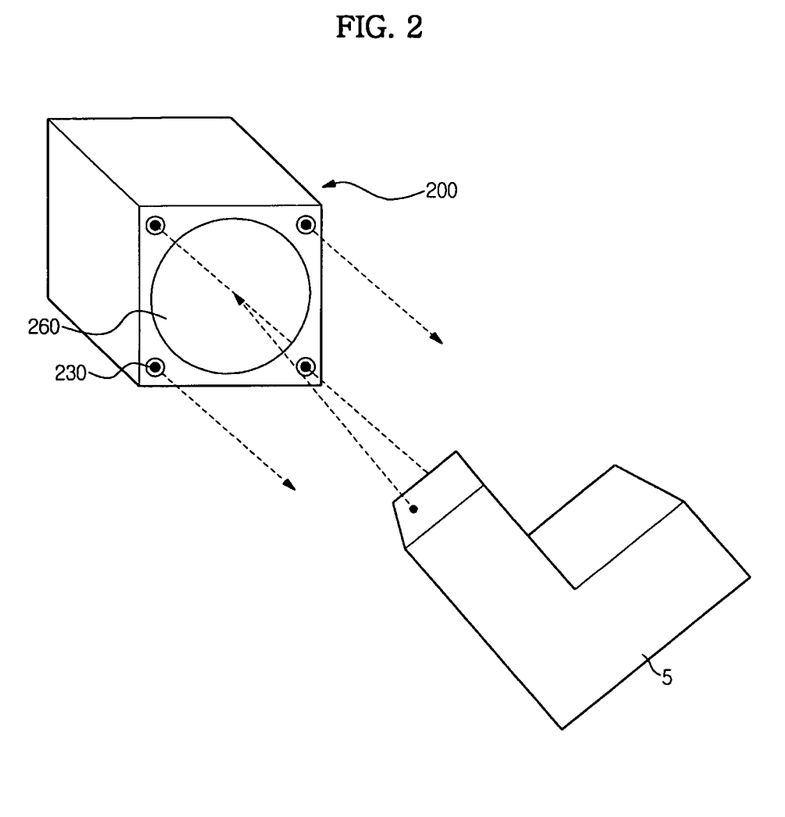
FIG. 2 is a perspective view illustrating a TOF (Time Of Flight) sensor unit for use in the system for extracting 3D coordinates according to an embodiment.

FIG. 2 is a perspective view illustrating a TOF sensor unit for use in the system for extracting 3D coordinates according to an embodiment.

Referring to FIG. 2, the TOF sensor unit 200 includes a light emitting unit 230 and a light receiving unit 260. If the light emitting unit 230 outputs infrared light varying sinusoidally, an image cell of the light receiving unit 260 receives light reflected from the target object 5, such that it calculates the distance traveled by the light. On the basis of the calculated distance traveled by the light, the TOF sensor unit 200 collects several thousand image cells or tens of thousands of image cells, and accumulates the collected image cells, such that it makes one-depth image composed of 3D coordinates.

The TOF sensor unit 200 includes a device (for example, a laser distance sensor, an ultrasound sensor, etc.) capable of obtaining distance information about the target object 5.

The TOF sensor unit 200 may obtain 3D distance information using a Time of Flight (TOF) scheme in which the infrared light (IR) emitted from the light emitting unit 230 is reflected from the target object 5 and returns to the light receiving unit 260. The TOF sensor unit 200 may calculate 3D distance information from the infrared-light-intensity image without using additional complicated calculation processes, thereby obtaining 3D distance information in real time.

Figure 3:
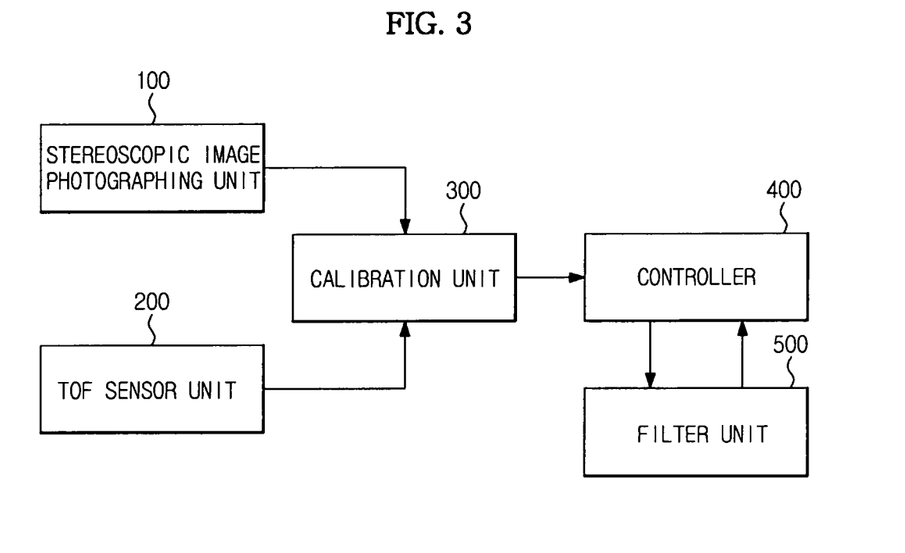
FIG. 3 is a block diagram illustrating a system for extracting 3D coordinates according to an embodiment.

FIG. 3 is a block diagram illustrating a system for extracting 3D coordinates according to an embodiment.

The stereoscopic image photographing unit 100 of FIG. 1 may obtain 3D coordinates of the target object 5 irrespective of the surface material of the target object 5, and may adjust the distance for 3D-coordinates detection of the target object 5 according to categories of used lenses.

However, the stereoscopic image photographing unit 100 has a disadvantage in that it has a large error of 3D coordinates obtained from a region of a small texture and consumes a long time to calculate 3D coordinates.

In addition, if a region having no pattern or a region having occlusion phenomenon is present, calculation of the disparity value is not possible and, in turn, calculation of the 3D coordinates of the target object 5 is not possible.

In addition, the TOF sensor 200 shown in FIG. 2 may obtain 3D coordinates of the target object 5 in real time, and has correct distance resolution.

However, an unexpected error may occur in 3D coordinates of the target object 5 according to reflection characteristics of the surface of the target object 5. If there arises a phase shift of $2\pi$ or higher when measuring the time elapsed until the infrared light (IR) emitted from the light emitting unit 230 is reflected from the target object 5 and then returns to the light receiving unit 260, it is impossible for the system of FIG. 2 to correctly calculate 3D coordinates of the target object 5.

In order to more accurately calculate 3D coordinates by solving the above-mentioned problems of the stereoscopic image photographing unit 100 and the TOF sensor unit 200, an embodiment provides a system for extracting 3D coordinates as shown in FIG. 3.

Referring to FIG. 3, the system for extracting 3D coordinates includes a stereoscopic image photographing unit 100, a TOF sensor unit 200, a calibration unit 300, a controller 400, and a filter unit 500.

Each of the stereoscopic image photographing unit 100 and the TOF sensor unit 200 provides 3D coordinates of the obtained object (5) images or other 3D coordinates of the obtained image pixels to the calibration unit 300 or the controller 400.

The calibration unit 300 maps pixel coordinates of each object's image captured by the stereoscopic image photographing unit 100 to 3D coordinates acquired through the TOF sensor unit 200, thereby calibrating the mapped result.

The controller 400 receives the calibrated 3D coordinates of the object 5 from the calibration unit 300 as an input.

The controller 400 determines the presence or absence of each set of pixel coordinates obtained through the stereoscopic image photographing unit 100 and the presence or absence of a value of the distance (to the target object 5) measured through the TOF sensor unit 200 corresponding to each set of pixel coordinates. The controller 400 calculates a disparity value on the basis of the distance value or each set of pixel coordinates acquired through the stereoscopic image photographing unit 100, and calculates 3D coordinates of the object on the basis of the calculated disparity value.

The filter unit 500 determines whether the disparity value calculated by the controller 400 is equal to or higher than a predetermined value. If the calculated disparity value is equal to or higher than the predetermined value, the filter unit 500 deletes 3D coordinates of the object 5 in response to the calculated disparity value. If the calculated disparity value is less than the predetermined value, the filter unit 500 transmits 3D coordinates of the object 5 to the controller 400 in response to the calculated disparity value.

Figure 4:
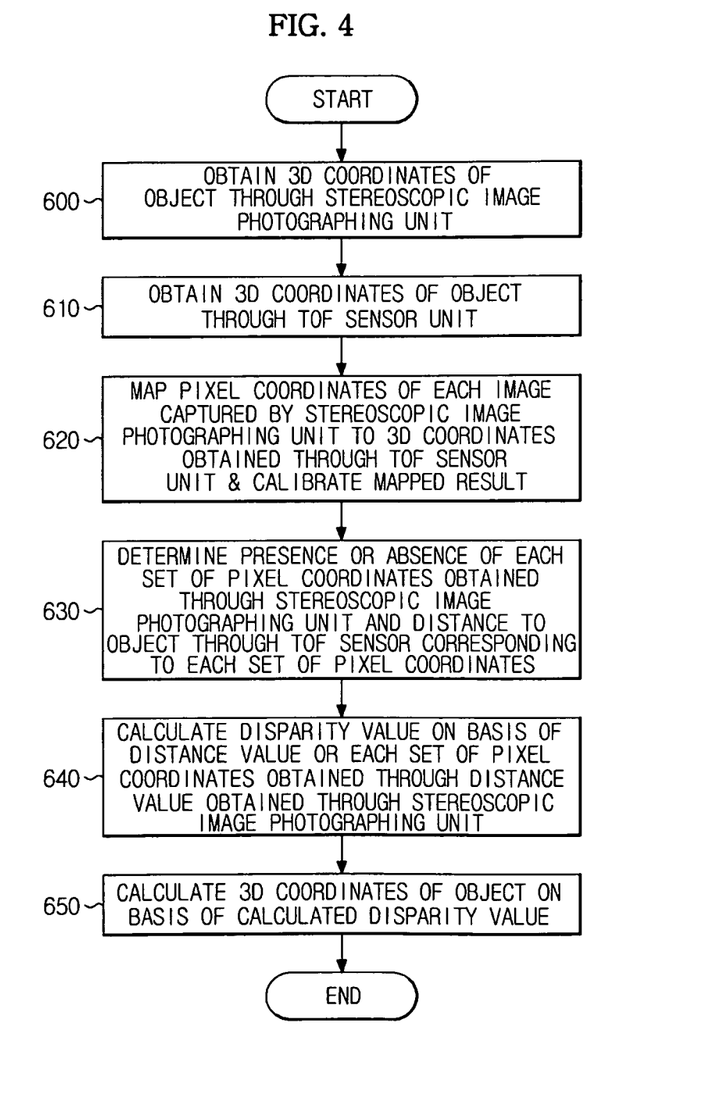
FIG. 4 is a flowchart illustrating a system for extracting 3D coordinates according to an embodiment.

FIG. 4 is a flowchart illustrating a system for extracting 3D coordinates according to an embodiment.

First, the stereoscopic image photographing unit 100 of the system captures an image of the object 5 using each of the photographing lenses 110 and 120 so as to obtain two images, and obtains 3D coordinates of the object 5 on the basis of pixel coordinates $((u_L, v_L)$ and $(u_R, v_R))$ respectively contained in the two images (Operation 600).

Next, the system measures the distance to the object 5 through the TOF sensor unit 200, and obtains 3D coordinates of the object 5 on the basis of the measured distance (Operation 610).

Pixel coordinates of each image captured by the stereoscopic image photographing unit 100 are mapped to 3D coordinates obtained through the TOF sensor unit 200, and the mapped result is calibrated (Operation 620). The above-mentioned operation 620 is considered to be a scale matching process in which 3D coordinates obtained through the TOF sensor unit 200 are applied to pixel coordinates of each image obtained through the stereoscopic image photographing unit 100.

The controller 400 determines the presence or absence of each set of pixel coordinates obtained through the stereoscopic image photographing unit 100 and the presence or absence of a value of the distance (to the object 5) measured through the TOF sensor unit 200 corresponding to each set of pixel coordinates (Operation 630).

The controller 400 calculates a disparity value on the basis of the distance value or each set of pixel coordinates acquired through the stereoscopic image photographing unit 100 (Operation 640).

The controller 400 calculates 3D coordinates of the object 5 on the basis of the calculated disparity value (Operation 650).

Figure 5:
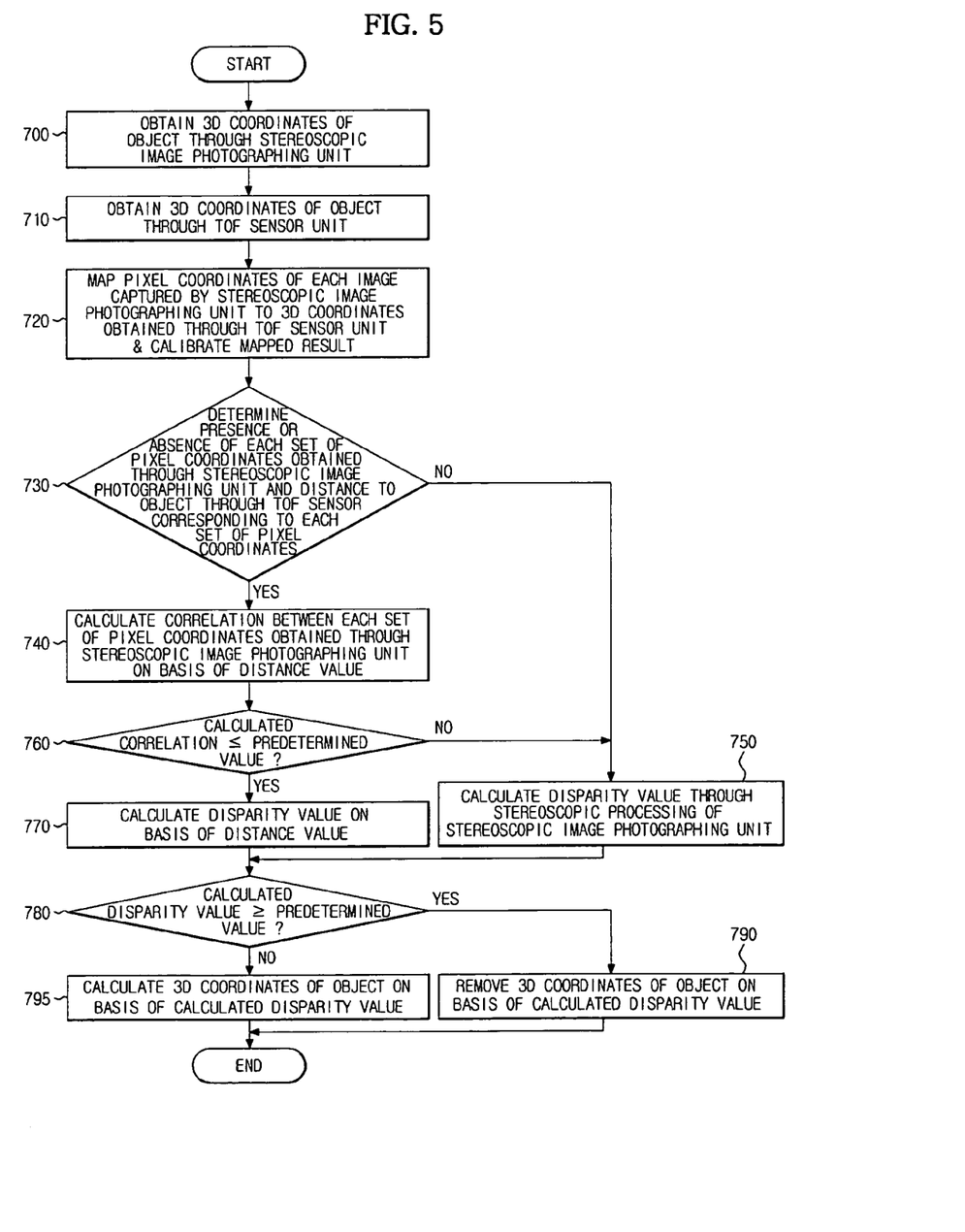
FIG. 5 is a flowchart illustrating a method for extracting 3D coordinates according to an embodiment.

FIG. 5 is a flowchart illustrating a method for extracting 3D coordinates according to an embodiment.

First, the stereoscopic image photographing unit 100 of the system captures an image of the object 5 using each of the photographing lenses 110 and 120 so as to obtain two images, and obtains 3D coordinates of the object 5 on the basis of pixel coordinates $((u_L, v_L)$ and $(u_R, v_R))$ respectively contained in the two images (Operation 700).

Next, the system measures the distance to the object 5 through the TOF sensor unit 200, and obtains 3D coordinates of the object 5 on the basis of the measured distance (Operation 710).

Pixel coordinates of each image captured by the stereoscopic image photographing unit 100 are mapped to 3D coordinates obtained through the TOF sensor unit 200, and the mapped result is calibrated (Operation 720). The above-mentioned operation 720 is considered to be a scale matching process in which 3D coordinates obtained through the TOF sensor unit 200 are applied to pixel coordinates of each image obtained through the stereoscopic image photographing unit 100.

The controller 400 determines the presence or absence of each set of pixel coordinates obtained through the stereoscopic image photographing unit 100 and the presence or absence of a value of the distance (to the object 5) measured through the TOF sensor unit 200 corresponding to each set of pixel coordinates (Operation 730).

If each set of pixel coordinates obtained through the stereoscopic image photographing unit 100 and the value of the distance (to the object 5) measured by the TOF sensor unit 200 corresponding to each set of pixel coordinates obtained through the stereoscopic image photographing unit 100 are present, the controller 400 calculates correlation between respective pixel coordinates obtained through the stereoscopic image photographing unit 100 (Operation 740).

Correlation calculation is based on Sum of Absolute Differences (SAD). SAD is a barometer of correlation between respective pixel coordinates obtained through the stereoscopic image photographing unit 100. SAD is represented by the following equation (1).

Equation (1)

$$SAD(x, y, d) = \sum_{i=-\frac{1}{2}(win_x-1)}^{\frac{1}{2}(win_x-1)} \sum_{j=-\frac{1}{2}(win_y-1)}^{\frac{1}{2}(win_y-1)} |I_L(x+i, y+j) - I_R(x+i+d, y+j)| \quad (1)$$

In Equation 1, 'x' and 'y' are respective pixel coordinates obtained through the stereoscopic image photographing unit 100, 'd' is a disparity value. In addition, '$win_x$' and '$win_y$' are reference coordinates on a window (or pixel), $I_L$ is intensity of pixel coordinates formed on the left photographing lens 110, and $I_R$ is intensity of pixel coordinates formed on the right photographing lens 120.

In the case where each set of pixel coordinates obtained through the stereoscopic image photographing unit 100 and the distance value to the object 5 measured through the TOF sensor unit 200 corresponding to each set of pixel coordinates are not present, the controller 400 calculates a disparity value through the stereoscopic processing of stereoscopic image photographing unit 100 (Operation 750).

In this case, in the case where each set of pixel coordinates obtained through the stereoscopic image photographing unit 100 and the distance value to the object 5 measured through the TOF sensor unit 200 corresponding to each set of pixel coordinates are not present, this means that it is impossible to measure the distance value through the TOF sensor unit 200 because of light reflection characteristics of the object 5. In addition, the scope of the present invention may also include another case in which image pixels of the stereoscopic image photographing unit 100 and the TOF sensor unit 200 are not mapped to each other.

In addition, the stereoscopic processing indicates that a processing position moves pixel by pixel along a scan line through Epipolar Geometry and thus calculates a disparity value having the highest correlation value.

That is, the above-mentioned description may be represented by the following equations (1) and (2).

Equation (2)

$$d(x, y) = \underset{d_{min} \leq d \leq d_{max}}{\operatorname{argmin}} \ SAD(x, y, d) \quad (2)$$

In Equation (2), the minimum SAD value indicates high correlation, and a disparity value having high correlation is calculated.

After performing operation 740, the controller 400 determines whether the calculated correlation is equal to or less than a predetermined value (Operation 760).

If the calculated correlation is equal to or less than a predetermined value, the controller 400 calculates a disparity value on the basis of the distance value (Operation 770).

If the calculated correlation is greater than the predetermined value, the controller 400 calculates a disparity value through the stereoscopic processing of the stereoscopic photographing 100 (Operation 750).

Next, the controller 400 determines whether a disparity value calculated at each operation 750 or 770 is equal to or higher than a predetermined value (operation 780).

The above-mentioned operation indicates a filtering process in which it is determined whether the calculated disparity value correctly reflects two images obtained through the stereoscopic image photographing unit 100.

In order to enable the calculated disparity value to correctly reflect coordinates of the two image pixels obtained through the stereoscopic image photographing unit 100, the calculated disparity value needs to satisfy the following equation.

$$D_R(x+D_L(x,y),y)=-D_L(x,y) \quad \text{Equation}$$

The above-mentioned equation indicates that, under the condition that the right image's position corresponding to the left image is calculated and the left image's position is calculated using the disparity value, the calculated right image position and the calculated left image position must be identical to each other.

Through the above-mentioned equation, the system according to embodiments may obtain reliable 3D coordinates simultaneously while obviating the shortcomings of the stereoscopic image photographing unit 100 and the TOF sensor unit 200.

When determining whether the calculated disparity value is equal to or higher than a predetermined value, if the calculated disparity value is equal to or higher than the predetermined value, the controller 400 removes the obtained 3D coordinates of the object 5 in response to the calculated disparity value (Operation 790). Herein, if the calculated disparity value is equal to or higher than the predetermined value, this means that the calculated disparity value inaccurately indicates the position of the object 5.

If the calculated disparity value is less than the predetermined value, the controller 400 calculates 3D coordinates of the object 5 in response to the disparity value (Operation 795).

As is apparent from the above description, the system and method for extracting 3D coordinates according to embodiments may extract 3D coordinates having reliability higher than that of 3D coordinates obtained from either the stereoscopic image photographing unit or the TOF sensor unit.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for extracting 3D coordinates comprising:
a stereoscopic image photographing unit to obtain two images by capturing an image of an object using each of two photographing lenses, and obtain 3D coordinates of the object on the basis of coordinates of each pixel contained in each of the two images;
a Time Of Flight (TOF) sensor unit to measure a value of a distance to the object, and obtain 3D coordinates of the object on the basis of the measured distance value;
a controller to determine whether each set of pixel coordinates obtained through the stereoscopic image photographing unit and the distance value to the object measured through the TOF sensor unit corresponding to each set of pixel coordinates are present or not, calculate a disparity value on the basis of the distance value or the pixel coordinates obtained through the stereoscopic image photographing unit according to the determined result, and calculate 3D coordinates of the object on the basis of the calculated disparity value; and
a calibration unit to map the pixel coordinates of each image captured through the stereoscopic image photographing unit to 3D coordinates obtained through the TOF sensor unit, and calibrate the 3D coordinates,
wherein, if each set of pixel coordinates obtained through the stereoscopic image photographing unit and a value of a distance to the object measured through the TOF sensor unit corresponding to each set of pixel coordinates are present, the controller calculates the disparity value on the basis of the measured distance value, and
wherein the controller calculates correlation between each set of pixel coordinates obtained through the stereoscopic image photographing unit on the basis of the distance value, and calculates the disparity value on the basis of the calculated correlation.

2. The system according to claim 1, wherein the controller calculates the disparity value on the basis of the distance value when the calculated correlation is equal to or less than a predetermined value.

3. The system according to claim 2, further comprising:
a filter unit to determine whether the calculated disparity value is equal to or higher than a predetermined value, delete the calculated 3D coordinates of the object depending upon the calculated disparity value when the calculated disparity value is equal to or higher than the predetermined value, and feed back the calculated 3D coordinates of the object depending upon the calculated disparity value to the controller when the calculated disparity value is less than the predetermined value.

4. The system according to claim 1, wherein, if each set of pixel coordinates obtained through the stereoscopic image photographing unit and a distance to the object measured through the TOF sensor unit corresponding to each set of pixel coordinates are not present, the controller calculates the disparity value through stereoscopic processing of the stereoscopic image photographing unit.

5. The system according to claim 4, further comprising:
a filter unit to determine whether the calculated disparity value is equal to or higher than a predetermined value, delete the calculated 3D coordinates of the object depending upon the calculated disparity value when the calculated disparity value is equal to or higher than the predetermined value, and feed back the calculated 3D coordinates of the object depending upon the calculated disparity value to the controller when the calculated disparity value is less than the predetermined value.

6. The system according to claim 1, wherein the calibration to map the pixel coordinates of each image captured by the stereoscopic image photographing unit to the 3D coordinates obtained through the TOF sensor unit by a scale matching process in which 3D coordinates obtained through the TOF sensor unit are applied to pixel coordinates of each image obtained through the stereoscopic image photographing unit.

7. A method for extracting 3D coordinates comprising:
obtaining, by a stereoscopic image photographing unit, two images by capturing an image of an object using each of two photographing lenses, and obtaining 3D coordinates of the object on the basis of coordinates of each pixel contained in each of the two images;
measuring, by a Time of Flight (TOF) sensor unit, a value of a distance to the object, and obtaining 3D coordinates of the object on the basis of the measured distance value;
mapping pixel coordinates of each image captured by the stereoscopic image photographing unit to the 3D coordinates obtained through the TOF sensor unit, and calibrating the mapped result;
determining whether each set of pixel coordinates obtained through the stereoscopic image photographing unit and the distance value to the object measured through the TOF sensor unit corresponding to each set of pixel coordinates are present or not;
calculating a disparity value on the basis of the distance value or the pixel coordinates obtained through the stereoscopic image photographing unit according to the determined result; and
calculating 3D coordinates of the object on the basis of the calculated disparity value,
wherein the calculation of the disparity value on the basis of the distance value or each set of pixel coordinates obtained through the stereoscopic image photographing unit includes:
calculating the disparity value on the basis of the measured distance value, if each set of pixel coordinates obtained through the stereoscopic image photographing unit and a value of the distance to the object measured through the TOF sensor unit corresponding to each set of pixel coordinates are present; and
calculating correlation between each set of pixel coordinates obtained through the stereoscopic image photographing unit on the basis of the distance value when each set of pixel coordinates obtained through the stereoscopic image photographing unit and a value of the distance to the object measured through the TOF sensor unit corresponding to each set of pixel coordinates are present, and calculating the disparity value on the basis of the calculated correlation.

8. The method according to claim 7, wherein the calculation of the disparity value on the basis of the calculated correlation further includes:
calculating the disparity value on the basis of the distance value when the calculated correlation is equal to or less than a predetermined value.

9. The method according to claim 8, further comprising:
determining whether the calculated disparity value is equal to or higher than a predetermined value,
removing the calculated 3D coordinates of the object depending upon the calculated disparity value when the calculated disparity value is equal to or higher than the predetermined value; and calculating 3D coordinates of the object in response to the calculated disparity value when the calculated disparity value is less than the predetermined value.

10. The method according to claim 7, wherein the calculation of the disparity value on the basis of the distance value or each set of pixel coordinates obtained through the stereoscopic image photographing unit includes:
calculating the disparity value through stereoscopic processing of the stereoscopic image photographing unit, if each set of pixel coordinates obtained through the stereoscopic image photographing unit and a distance to the object measured through the TOF sensor unit corresponding to each set of pixel coordinates are not present.

11. The method according to claim 7, further comprising:
determining whether the calculated disparity value is equal to or higher than a predetermined value,
removing the calculated 3D coordinates of the object depending upon the calculated disparity value when the calculated disparity value is equal to or higher than the predetermined value; and
calculating 3D coordinates of the object in response to the calculated disparity value when the calculated disparity value is less than the predetermined value.

12. The method according to claim 7, wherein the mapping pixel coordinates of each image captured by the stereoscopic image photographing unit to the 3D coordinates obtained through the TOF sensor unit, the mapping is performed by a scale matching process in which 3D coordinates obtained through the TOF sensor unit are applied to pixel coordinates of each image obtained through the stereoscopic image photographing unit.

* * * * *